Figure 3:
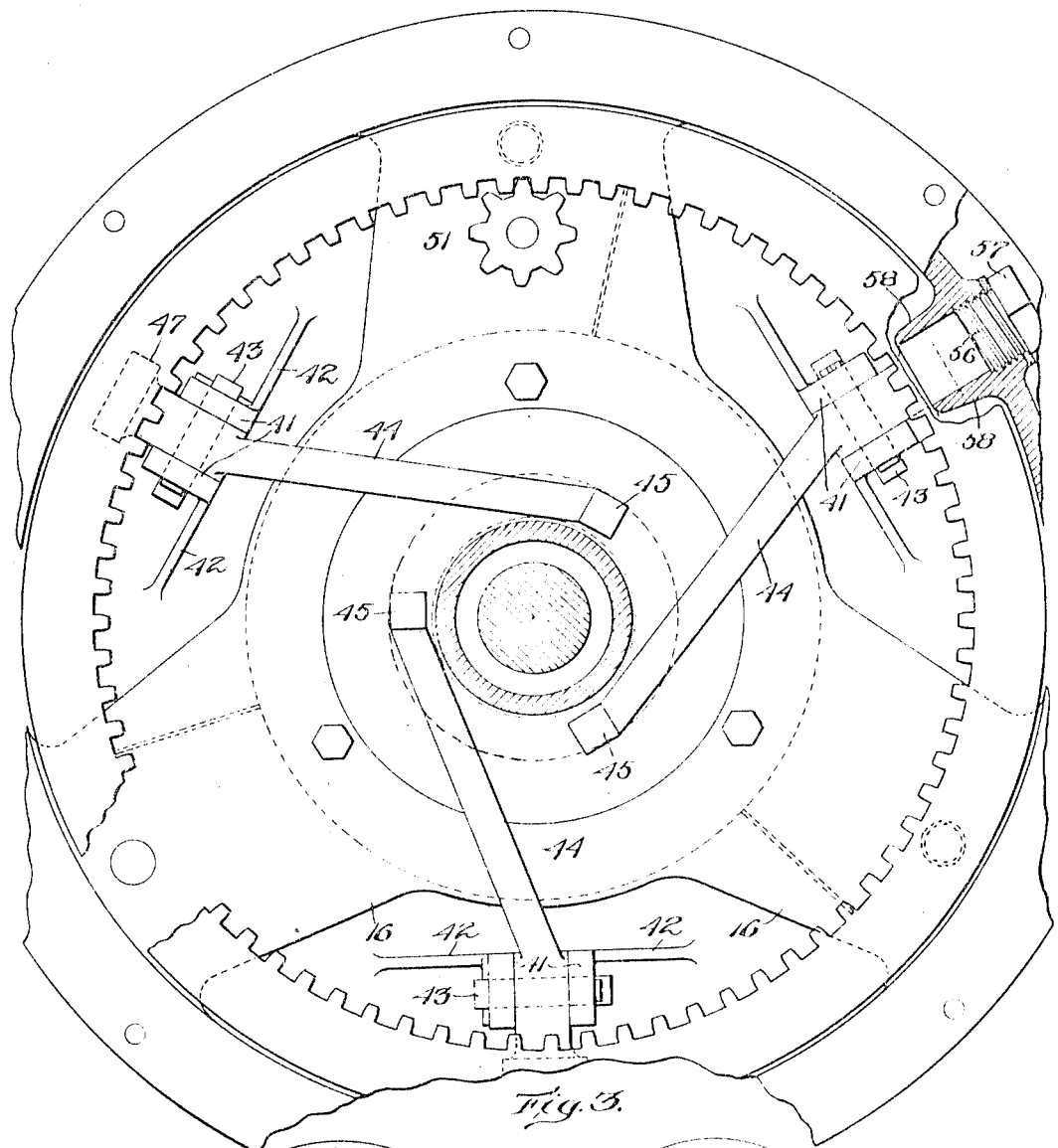

A. B. MORSE.
CLUTCH.
APPLICATION FILED FEB. 21, 1912.
1,063,998.
Patented June 10, 1913.
2 SHEETS—SHEET 1.
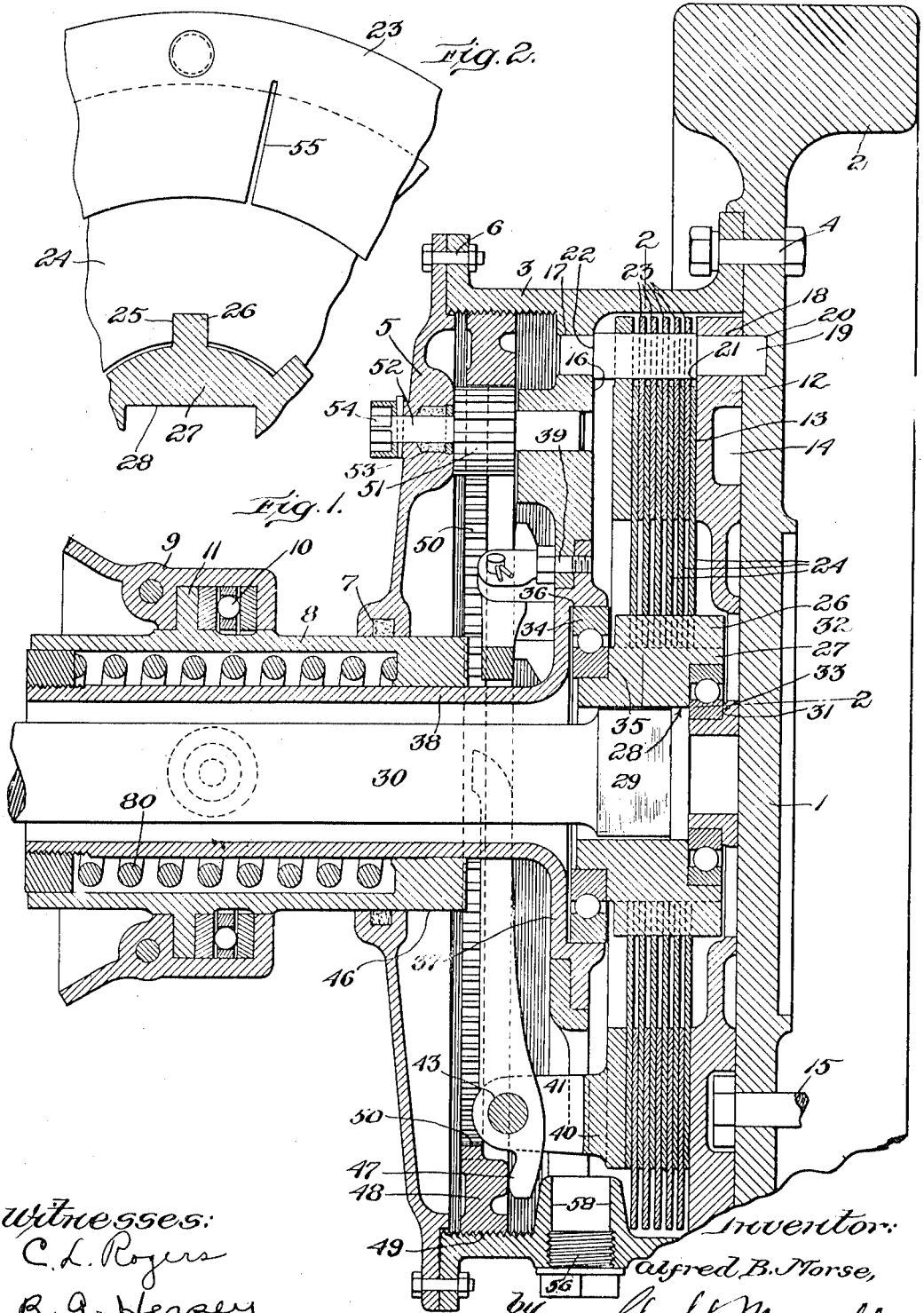
Witnesses:
C. L. Rogers
R. G. Hersey
Inventor:
Alfred B. Morse,
by Geo. S. Maxwell
Atty.

A. B. MORSE.
CLUTCH.
APPLICATION FILED FEB. 21, 1912.

1,063,998.

Patented June 10, 1913.

2 SHEETS—SHEET 2.

Witnesses:
C. L. Rogers
R. G. Hersey

Inventor:
Alfred B. Morse,
by Geo. H. Maxwell,
Atty.

UNITED STATES PATENT OFFICE.

ALFRED B. MORSE, OF SOUTH EASTON, MASSACHUSETTS.

CLUTCH.

1,063,998.   Specification of Letters Patent.   Patented June 10, 1913.

Application filed February 21, 1912. Serial No. 679,150.

*To all whom it may concern:*

Be it known that I, ALFRED B. MORSE, a citizen of the United States, and resident of South Easton, Bristol county, State of Massachusetts, have invented an Improvement in Clutches, of which the following description, in connection with the accompanying drawings, is a specification, like letters on the drawings representing like parts.

This invention relates to clutches and, while having other and more general fields of usefulness, is especially designed for use in connection with high speed motors for operating automobiles, or other purposes where there is special need for a clutch which is not only positive, durable, and long lived, but free running at all times, and which does not require adjustment or attention excepting at very long intervals.

An important feature of the invention has to do with an improved construction of friction clutch plates or disks, whereby the effectiveness and length of service thereof is materially increased by a novel provision which at the same time avoids liability to distortion of the clutch plates in use and provides for a proper distribution of lubricant between the co-acting surfaces.

It is an important feature of my present invention to provide a plurality of alternating friction disks so that provision shall be made to allow each alternate disk to expand and contract during varying degrees of heat and cold, and yet to form said disks with the requisite strength necessary for the severe strain to which they are subjected. I accomplish this desirable result by having radial slots in the alternate disk members of my improved clutch, which slots, however, extend only as far, or substantially as far as the overlapping of the alternate disk to be engaged with said radially slit disk. By arranging the disks of my improved clutch in this manner with an overlapping portion, I am enabled to have provision for the expansion and contraction just mentioned, where the same is most needed, viz., on the overlapping or contacting part of the friction disks.

The above and other objects of the invention will be better understood from the following detailed description, in connection with the accompanying drawings, wherein I have illustrated the novel features in connection with the type of clutch mechanism shown in my Patent No. 1,016,427, patented February 6, 1912; it being understood that this particular embodiment of the features of novelty is merely for the purpose of illustrating the invention and in no way restrictive thereof.

Figure 4:
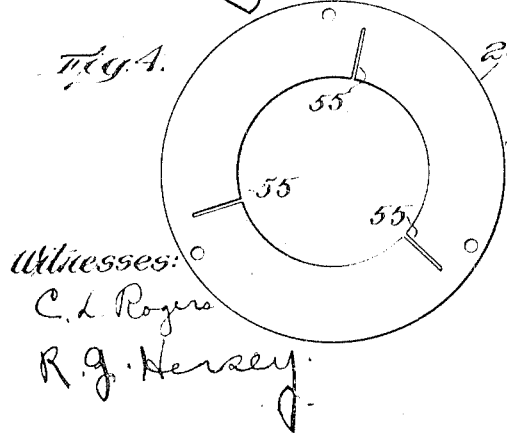
Figure 5:
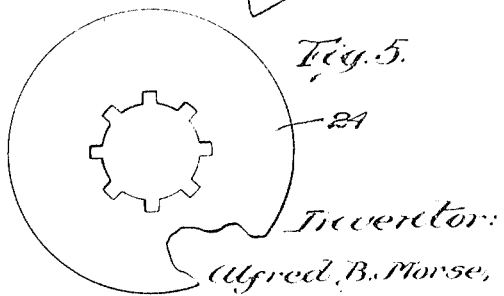

Referring to the drawings, Figure 1 is a central vertical longitudinal section of the clutch mechanism; Fig. 2 is a transverse sectional detail of a portion of the internal mechanism, approximately on line 2—2 of Fig. 1; Fig. 3 is a sectional view, taken at the front side of the clutch, with the cover removed; and Figs. 4 and 5 are detail elevations, showing the forms of the co-acting clutch plates.

The general construction of the clutch mechanism illustrated is similar to that of my said patent, and comprises an outer part formed as a heavy plate 1, preferably peripherally enlarged at 2 to constitute a fly-wheel, an annular rim 3 bolted to said fly-wheel at 4, and a front plate 5 bolted to the rim at 6, and herein shown as provided with a packing gland 7 to bear on the movable sleeve 8, which actuates the clutch by means of a spring 80, and any usual forked or other actuating lever (not shown) connected to a collar 9, shown as provided with ball bearings 10 to engage a flange 11 of said sleeve. Next to the side or face 1 of the clutch casing, a plate or casting 12 is mounted, having a smooth friction face 13 and preferably containing an annular recess 14 to receive the heads of bolts 15 provided for securing the outer part of the clutch to the engine connection in well known manner. The rim 3 is provided with a preferably integral spider or weblike frame 16 extending from the inner wall thereof about midway from the edges of the rim, said frame 16 being provided with holes 17 in alinement with similar holes 18 in the plate 12 and in said holes are mounted heavy pins 19, which extend into and snugly fit recesses 20 provided therefor in the inner face of the side 1 of the casing, said pins having shoulders 21 fitting against the outer edge of the holes 18 to hold the casting or plate 12 snugly in place, and shoulders 22 fitting against the adjacent edge of the holes 17 to hold the pins immovable when the parts are all clamped together. On these pins are loosely mounted a series of plane, annular friction plates 23, free to slide lengthwise of the pins 19 and held against relative rotary movement by said pins. Coöperating with these friction plates 23 and disposed in alternation therewith, are a series of friction plates or disks 24 centrally apertured, and provided with notches 25, as best seen in Fig. 2, fitting loosely over longitudinal ribs or projections 26 which extend radially from a transmission block or hub 27, which has an angular axial opening 28, shown as square, to fit on to the similarly squared end 29 of the power transmission shaft 30, which transmits the power to the driving gear of the vehicle.

A ball bearing ring 31 is held between shoulders 32 and 33, provided respectively on said hub and the inner hublike central portion of the casting 12, and a similar ball bearing ring 34 is held between a similar shoulder 35 on said hub 27 and the shoulder 36 of the outwardly turned flange 37 of a sleeve 38, on which the actuating sleeve 8 slides, said flange 37 being secured to the inner edge of the web or frame 16 by bolts 39. The friction disks at one end of the series bear against the flat bearing face 13 of the plate 12, while at the other end of the series they are engaged by a clamping ring 40, from which project pairs of ears 41, three of said pairs being herein shown, as best seen in Fig. 3, preferably strongly braced by ribs 42, the internal frame or web 16 being cut away to permit these ears and ribs to project forward the desired distance, and in these ears are pivoted at 43 clamping levers, whose long arms 44 extend inwardly, preferably as near the center as possible to a position approximately tangent of the sleeve 38, and having out turned flat ends 45 to be engaged by the blocklike heavy end 46 of the movable clutch-lever actuator sleeve 8. The short arms 47 on the other hand, are made as short as possible, so as to get as strong a leverage, and hence friction, on the coöperating friction plates 23, 24, as may be attained. These short arms 47 of the clamping levers bear on the inner face of a relatively stationary gear ring 48. This ring not only constitutes the bearing point for the clamping levers, but is the main portion of the adjusting mechanism, and to this end is made adjustable transversely of the clutch by a threaded engagement at 49 with the inner rim face of the casing, said ring 48 being provided with internal gear teeth 50 which are engaged by a pinion 51, whose shaft 52 passes through a packing gland 53 to the outside of the front face or casing wall 5, where said shaft has a squared end 54 for receiving a socket wrench whenever adjustment of the clutch is required.

The construction of the illustrative form of clutch shown having been described, the novel features of the present invention and the manner in which they are incorporated in the form of clutch shown will now be explained. The series of outer clutch plates or annular disks 23 which are carried by the casing, by having the pins 19 passed through said plates near their outer peripheries, can, for this reason, only have engagement over the inner portion of their lateral faces with the coöperative plates 24, the plates 24 being of a sufficiently reduced diameter to come within the pins 19, the extent of this lateral face engagement between the plates 23, 24 being best shown in Fig. 2. It has been found in practice that with the outer casing carrying plates 23 formed as described in my said patent, there is a tendency for these plates to warp and buckle to an extent so that they are materially distorted and prevented from most effective coöperation with the plates 24; this buckling and distortion is for the reason that the active or inner portions of the plates 23, which are in frictional engagement with the plates 24, become more or less highly heated and therefore the metal in this portion of the plates expands, while the metal in the outer peripheral portion of said plates being inactive and not frictionally engaged, remains relatively cool, and the tendency to expansion of the inner portions being thus resisted by the outer or rim portions of the plates, the result is that the buckling and the distortion mentioned follow to a greater or less extent, and so much as to interfere with the most successful operation of the clutch. To prevent this buckling and warping of the plates, they are formed by the present improvements with a series of slots or recesses, spaced around the plates and extending from the central opening thereof out well toward the outer periphery, or substantially across the zone of frictional engagement. As shown, three of these slots, designated 55, are formed in each of the plates 23, these slots extending radially of the plates, and to the outer circumference of the plates 24, when the parts are in assembled relation, or a little beyond the same as seen in Fig. 2.

It will be observed that the plates 23 are relatively wide, so that there is a continuous band of stock beyond the slots, of sufficient size and strength to carry the load so that the provision of the slots 55 does not weaken the structure, or reduce its power transmitting capacity. These slots are made wide enough so as to permit any expansion of the metal which may occur, to take place without resistance and without causing any tendency to warp the plates, as would be the case if there were no provision to accommodate the increased mass of the metal as it becomes heated. In addition to this prime function of these slots 55, they also serve a further and likewise important function in acting as oil distributers to permit lubricant to flow in between the co-acting frictional surfaces and be evenly distributed over all parts thereof, it being understood that the active clutch portions are preferably run in oil. In the illustrative clutch shown, the inclosed casing within which the clutch plates are fitted is filled with a supply of oil through an aperture 56 closed by a threaded plug 57. To prevent leaks of oil through this inlet supply aperture, should the plug 57 not be tightly seated, and especially by the driving action of centrifugal force, I preferably provide a tubular portion or collar 58 surrounding this aperture, and desirably formed integral with the metal of the casing. This collar portion extends inward from the inner periphery of the casing rim 3 sufficiently so that its end projects beyond the layer of oil which is held distributed around the casing by centrifugal force when the parts are being rotated at high speed.

In operation the spring 80, upon release of the clutch lever by the operative, moves the sleeve 8 lengthwise to the right, as seen in Fig. 1, causing the clamping lever to exert through the short arms a very powerful leverage to bring the friction plates 23, 24 together with the desired pressure for transmitting the power of the engine to the shaft 30, and thence to the automobile or other driven mechanism. My improved form of the plates 23, with the slots 55 to permit expansion of their active portions insures that the series of plates 23 24 will always remain in perfect flatwise engagement over their entire inner engaging portions, thus securing the most effective clutching action, and at the same time greatly promoting longevity of the active parts. The durability and effective action of the clutch plates is also largely enhanced by the action of the slots 55 in serving as oil distributers in the manner described.

As already intimated, I regard my invention in the parts set forth as broadly new, and it is accordingly so defined in certain of the appended claims; I particularly wish it to be understood that I am not limited to the illustrative form of clutch mechanism shown herein, nor to the specific form in which the present improvements are embodied, except in the particulars specified in the claims.

Having described my invention, what I claim as new and desire to secure by Letters Patent is as follows:

1. A clutch, comprising a plurality of alternately arranged larger and smaller plate members concentrically mounted for frictional power transmitting engagement, the larger members being in annular form and having spaced apart slots extending from its central opening outward approximately to the circumference of the smaller overlapping members.

2. A clutch, comprising a closed, rotatably mounted casing and coöperative clutch members housed therein, said casing having provision for introducing lubricant, consisting in an opening with a removable closure and an inwardly extending collar formed around said opening for the purpose stated.

In testimony whereof, I have signed my name to this specification, in the presence of two subscribing witnesses.

ALFRED B. MORSE.

Witnesses:
 PATRICK J. MURPHY,
 HENRY A. PARRY.